(12) United States Patent
Kanno

(10) Patent No.: US 11,630,456 B2
(45) Date of Patent: Apr. 18, 2023

(54) AUTONOMOUS TRAVELLING CART SYSTEM

(71) Applicant: TOSHIBA TEC KABUSHIKI KAISHA, Tokyo (JP)

(72) Inventor: Hiroki Kanno, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 493 days.

(21) Appl. No.: 16/690,010

(22) Filed: Nov. 20, 2019

(65) Prior Publication Data
US 2020/0257293 A1    Aug. 13, 2020

(30) Foreign Application Priority Data
Feb. 8, 2019    (JP) ............................... JP2019-021798

(51) Int. Cl.
*G05D 1/00* (2006.01)
*G05D 1/02* (2020.01)
(Continued)

(52) U.S. Cl.
CPC ............ *G05D 1/0088* (2013.01); *B60L 53/12* (2019.02); *B62B 3/14* (2013.01); *B62B 5/0036* (2013.01);
(Continued)

(58) Field of Classification Search
CPC .. G05D 1/0088; G05D 1/0214; G05D 1/0225; G05D 1/0276; G05D 1/0274;
(Continued)

(56) References Cited

U.S. PATENT DOCUMENTS 9,273,973 B2    3/2016    Sakamoto
10,639,794 B2    5/2020    Cousins et al.
(Continued)

FOREIGN PATENT DOCUMENTS

CN    108945068 A    12/2018
JP    2010-055444 A    3/2010
(Continued)

OTHER PUBLICATIONS

First Office Action dated Dec. 24, 2021 issued in CN Application No. 201911135387.0, with English translation, 15 pages.
(Continued)

*Primary Examiner* — Brian P Sweeney
(74) *Attorney, Agent, or Firm* — Foley & Lardner LLP

(57) ABSTRACT

An autonomously traveling cart system includes a mover, a memory, a position detector, and a processor. The mover moves a cart main body. The memory stores map data indicating an autonomously traveling cart storage space installed in an area where the cart main body is movable. The position detector detects a position of the cart main body. The processor designs a moving route from the position of the cart main body which the position detector detects toward the autonomously traveling cart storage space indicated by the map data, and allows the cart main body to move toward the autonomously traveling cart storage space by the mover.

12 Claims, 4 Drawing Sheets

(51) Int. Cl.
  *B60L 53/12* (2019.01)
  *B62B 5/00* (2006.01)
  *B62B 3/14* (2006.01)

(52) U.S. Cl.
  CPC .......... *B62B 5/0053* (2013.01); *B62B 5/0069* (2013.01); *G05D 1/0214* (2013.01); *G05D 1/0225* (2013.01); *G05D 1/0276* (2013.01); *B60L 2240/62* (2013.01)

(58) Field of Classification Search
  CPC ............ G05D 2201/0216; B60L 53/12; B60L 2240/62; B62B 3/14; B62B 5/0036; B62B 5/0053; B62B 5/0069; B62B 5/0063; B62B 3/00; B62B 5/00; Y02T 10/70; Y02T 10/7072; Y02T 10/72; Y02T 90/14; Y02T 90/16
  See application file for complete search history.

(56) References Cited

U.S. PATENT DOCUMENTS

| | | | |
|---|---|---|---|
| 10,831,195 B2 | 11/2020 | Ito | |
| 2015/0205300 A1* | 7/2015 | Caver | G05D 1/0278 701/23 |
| 2015/0262478 A1 | 9/2015 | Yoshida | |
| 2016/0260161 A1* | 9/2016 | Atchley | H04B 10/116 |
| 2017/0108860 A1* | 4/2017 | Doane | G05D 1/0255 |
| 2018/0276485 A1 | 9/2018 | Heck et al. | |

FOREIGN PATENT DOCUMENTS

| | | |
|---|---|---|
| JP | 2011-059043 A | 3/2011 |
| JP | 2014-085829 A | 5/2014 |
| JP | 2015-176497 A | 10/2015 |
| JP | 2017-217921 A | 12/2017 |
| JP | 2019-003602 A | 1/2019 |
| WO | WO-2018/003814 A1 | 1/2018 |

OTHER PUBLICATIONS

Notice of Reasons for Refusal dated Sep. 6, 2022 issued in JP Application No. 2019-021798, with English translation, 6 pages.

Decision of Refusal dated Feb. 14, 2023 issued in JP Application No. 2019-021798, with English translation, 5 pages.

\* cited by examiner

AUTONOMOUS TRAVELLING CART SYSTEM

CROSS-REFERENCE TO RELATED APPLICATION

This application is based upon and claims the benefit of priority from Japanese Patent Application No. 2019-021798, filed on Feb. 8, 2019, the entire contents of which are incorporated herein by reference.

FIELD

Embodiments described herein generally relate to an autonomously traveling cart system.

BACKGROUND

A shopping cart may be installed in a store or the like. Merchandise that is to be purchased is stored in the shopping cart. In recent years, it has been proposed to provide a shopping cart with an information terminal such as a display in order to provide various pieces of information to a user. A battery for operating the information terminal is mounted on such a shopping cart. The battery needs to be appropriately charged in advance so that the information terminal can operate if a user uses the shopping cart. For this reason, the shopping cart provided with the information terminal needs to be returned to a predetermined charging position when not in use in order to charge the battery in advance.

However, it is common for a user to leave a shopping cart in various locations surrounding a store after the user is finished using the shopping cart. For example, a user who visits a store by car may transfer purchased merchandise from a shopping cart to a car and then leave the shopping cart in a parking lot. As a result of shopping carts being left in various locations, it is not only difficult for subsequent users to use the shopping carts, but it also interferes with passage of vehicles or people around the store. Furthermore, where the shopping cart has a battery powering an information terminal, the battery may not be charged and use of the information terminal may be prohibited.

DETAILED DESCRIPTION

Embodiments described herein provide an autonomously traveling cart system capable of allowing a cart in any place to autonomously travel toward a predetermined autonomously traveling cart storage space.

In general, according to one embodiment, an autonomously traveling cart system includes a moving mechanism, a memory, a position detector, and a processor. The moving mechanism moves a cart main body. The memory stores map data indicating an autonomously traveling cart storage space installed in an area within which the cart main body is movable. The position detector detects a position of the cart main body (e.g., within the area within which the cart main body is movable relative to the autonomously traveling cart storage space, etc.). The processor designs (determines) a moving route from a position of the cart main body as detected by the position detector towards the autonomously traveling cart storage space as indicated by the map data, and causes the moving mechanism to move the cart main body toward the autonomously traveling cart storage space based on the moving route. Hereinafter, an autonomously traveling cart system according to one embodiment will be described with reference to the drawings.

The autonomously traveling cart system is a system in which a cart autonomously travels from a location and towards a predetermined autonomously traveling cart storage space. Articles (goods) such as merchandise (packages) are loaded on the cart according to the embodiment. The cart is then moved by an operation of a user. The cart is, for example, a shopping cart used in a commercial facility and the like, or a carrying cart used for carrying packages at an airport and the like.

The autonomously traveling cart system according to the embodiment is a system in which an autonomously traveling device is provided in a cart on which an information terminal including a display device or the like and a battery for supplying power to the information terminal are mounted. The battery mounted on the cart is charged by a charging facility (such as a power transmitter) installed in an autonomously traveling cart storage space in a state where the cart is stored in the autonomously traveling cart storage space. The autonomously traveling device detects the position of a cart main body and causes the cart main body to autonomously travel toward a predetermined autonomously traveling cart storage space to store the cart main body in the autonomously traveling cart storage space. In the following description, a case where the cart is mainly a shopping cart is primarily described.

Figure 1:
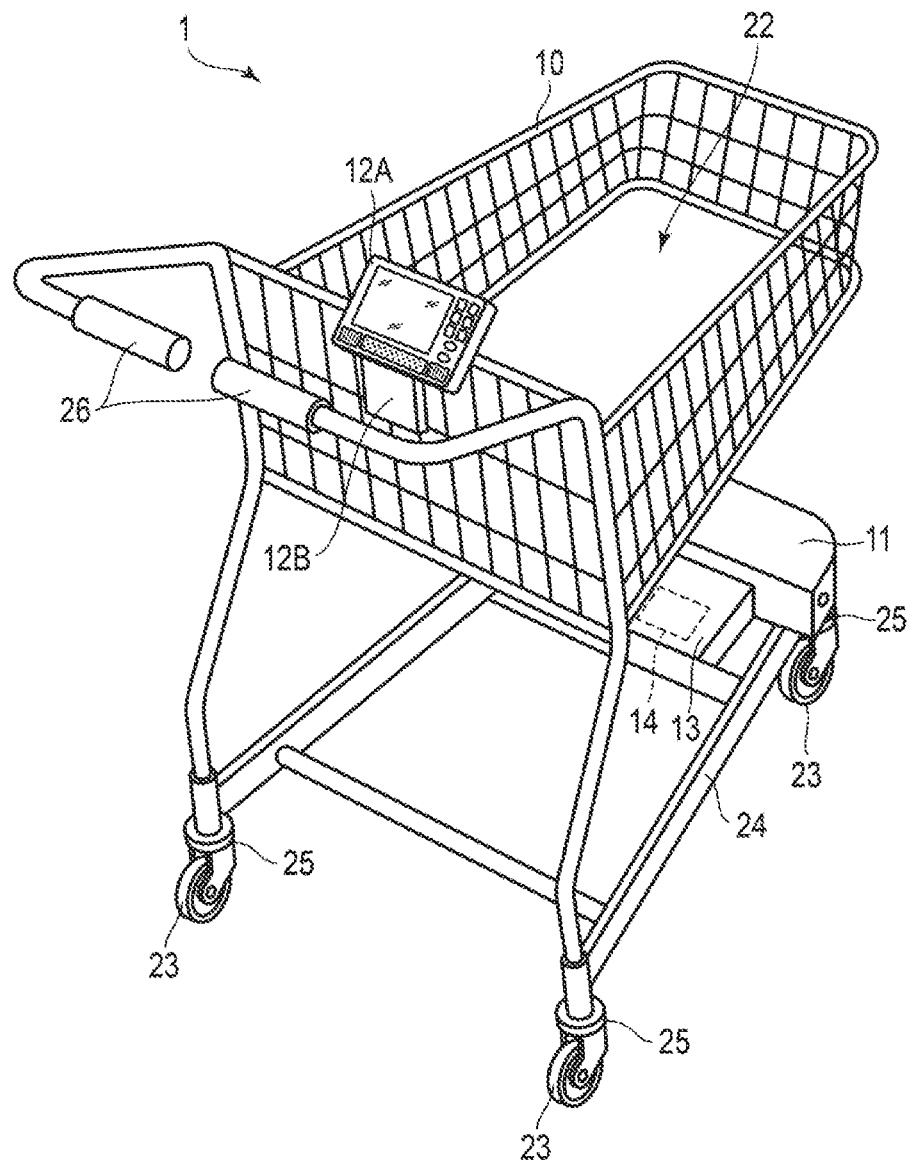
FIG. 1 is a perspective view illustrating a configuration example of a shopping cart as an autonomously traveling cart system according to one embodiment.

FIG. 1 is a perspective view illustrating a configuration example of an autonomously traveling cart system according to one embodiment.

In the configuration example shown in FIG. 1, an autonomously traveling cart system 1 includes a cart main body 10, an autonomously traveling device (autonomous driving device) 11, an information terminal 12, a battery 13, a power receiver 14, and the like.

The cart main body 10 moves under an operation of a user. For example, merchandise (packages) may be loaded on the cart main body 10 and the cart main body 10 may be pushed by a user through a parking lot. It is desirable to store the cart main body 10 in a predetermined autonomously traveling cart storage space if there is no user using the cart main body 10. A charging facility (for example, a power transmitter for transmitting power for charging) for charging the battery 13 is provided in the autonomously traveling cart storage space. The battery 13 is charged by the charging facility when the cart main body 10 is stored in the autonomously traveling cart storage space.

The cart main body 10 has a storage basket 22 for storing merchandise. The storage basket 22 is supported by a frame 24 that is provided with four casters 25. The four casters 25 are provided at four corners of a lower portion of the frame 24. Each caster 25 has a wheel 23 that is configured to rotate in a moving direction. The cart main body 10 moves as the wheels 23 of the casters 25 rotate on a floor surface. Each caster 25 is configured such that the wheel 23 freely rotates in a rotational direction. Accordingly, the cart main body 10 can freely change the moving direction by rotating the wheels 23.

The cart main body 10 is provided with a handle 26 on one surface side of the storage basket 22. The handle 26 is configured to be gripped (grasped) by a user. For example, a user may grip the handle 26 and then push the handle 26 to move the cart main body 10. In the present embodiment, the direction of pushing the storage basket 22 from the handle 26 is set as a forward direction. In the embodiment, the handle 26 side of the storage basket 22 is referred to as a front side and an opposite side thereof is referred to as a distal side.

The autonomously traveling device 11 includes a moving mechanism configured to move the cart main body 10. The autonomously traveling device 11 enables the cart main body 10 to move toward an autonomously traveling cart storage space when the cart main body 10 is not being used by a user. For example, the autonomously traveling device 11 may specify a moving route toward an autonomously traveling cart storage space and enable the cart main body 10 to move toward the autonomously traveling cart storage space by controlling the rotation and direction of the wheels provided in the cart main body 10.

The information terminal 12 is a device for providing merchandise information or various services to a user. The information terminal 12 operates with power from the battery 13 (the information terminal 12 is electrically coupled to the battery 13). The information terminal 12 is attached to the cart main body 10. In the example shown in FIG. 1, the information terminal 12 includes a user interface (UI) device 12A such as a tablet terminal and a merchandise reader 12B which acquires information of merchandise placed in the storage basket 22. Various devices that can operate with power from the battery 13 may be attached to the cart main body 10 as the information terminal 12. The information terminal 12 may include, for example, a charging device for charging electronic devices (for example, mobile phones, smartphones, and digital cameras) possessed by a user.

In the example shown in FIG. 1, the user interface device 12A of the information terminal 12 is attached to an upper portion of the front side of the storage basket 22 of the cart main body 10. The user interface device 12A is a computer including a display provided with a touch panel. For example, the user interface device 12A may display information of merchandise read by the merchandise reader 12B. The user interface device 12A may have a function of checking out merchandise (merchandise displayed in the display) in the storage basket 22 from which the merchandise information is read by the merchandise reader 12B. The user interface device 12A may have, in addition to the touch panel, an operation button for receiving an operation instruction from a user.

The merchandise reader 12B is a device that reads merchandise information. For example, the merchandise reader 12B may be an RFID tag reader that reads RFID tags and the like attached to merchandise. In this example, the merchandise reader 12B may read the RFID tags of merchandise that is place in and taken out of the storage basket 22. The merchandise reader 12B may also be a scanner that reads merchandise identification information such as a bar code attached to merchandise. The battery 13 is a power supply device for operating the information terminal 12. The battery 13 also is a power supply device for driving the autonomously traveling device 11. The battery 13 includes a secondary battery that stores power and a charging circuit for charging the secondary battery with power received by the power receiver 14. In this case, the battery 13 is configured to supply the power stored in the secondary battery to the information terminal 12 and the autonomously traveling device 11. In some embodiments, the autonomous travel cart system 1 includes two batteries 13, one battery 13 connected to the autonomously traveling device 11 and one battery connected to the information terminal 12. The battery 13 may be a power supply device included in the information terminal 12.

The power receiver 14 receives power transmitted from an external device (power transmitter). The battery 13 is charged with power received by the power receiver 14. In the embodiment, the power receiver 14 receives the power transmitted from the power transmitter as a charging facility installed in an autonomously traveling cart storage space or the like, and supplies the received power to the battery 13. The power receiver 14 receives power transmitted in a non-contact state and supplies the received power to the battery 13 as, for example, power for charging. In this case, the power receiver 14 has a power receiving antenna, a circuit, and the like. However, the power receiver 14 is not limited to receiving power in a non-contact state, and may receive power from the charging facility in a state where the cart main body 10 is stored in an autonomously traveling cart storage space.

The power receiver 14 is attached to the cart main body 10 so as to receive power from the charging facility. The charging facility is disposed in a predetermined place such as at an autonomously traveling cart storage space. For example, the power receiver 14 that receives power in a non-contact state may be attached to the cart main body 10 at a position that is opposite to a power transmitter installed in an autonomously traveling cart storage space when the cart main body 10 is stored in the autonomously traveling cart storage space. If, for example, power is transmitted upward from a power transmitter provided on the floor surface or the like in an autonomously traveling cart storage space, the power receiver 14 may be attached to the lower side of the cart main body 10 so as to receive the power from the floor surface. If the power transmitter is provided so as to transmit power to the side surface of the cart main body 10 when the cart main body 10 is stored in an autonomously traveling cart storage space, the power receiver 14 may be attached to the side surface of the cart main body 10.

Next, a configuration of a control system of the autonomously traveling cart system 1 will be described.

Figure 2:
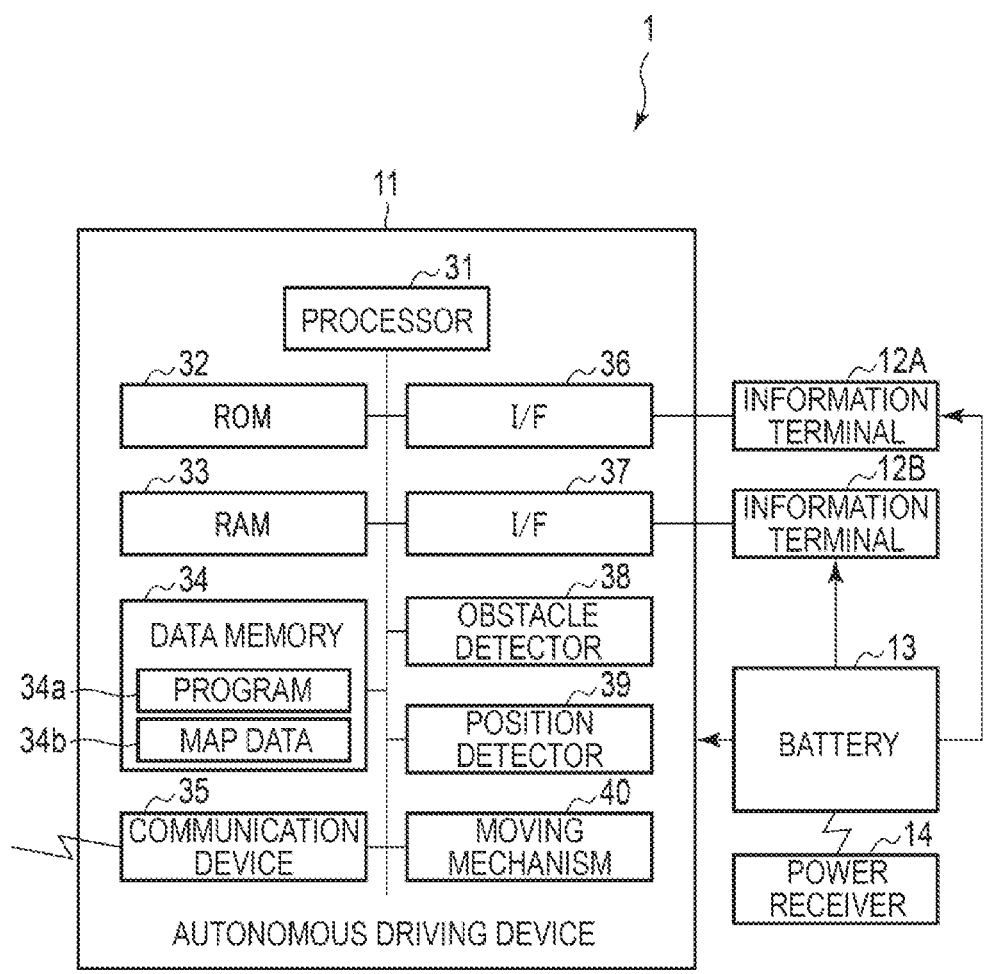
FIG. 2 is a block diagram illustrating a configuration example of a control system of the shopping cart.

FIG. 2 is a block diagram illustrating a configuration example of a control system of the autonomously traveling cart system 1 according to the embodiment.

As shown in FIG. 2, the autonomously traveling cart system 1 includes the autonomously traveling device 11, the information terminal 12, the battery 13, and the power receiver 14. The autonomously traveling device 11 is attached to the cart main body 10 and is configured to receive power from the battery 13. The autonomously traveling device 11 is also connected to the information terminal 12.

The battery 13 is connected to the power receiver 14 and is charged with power from the power receiver 14. The battery 13 supplies power to the information terminal 12.

The autonomously traveling device 11 has, as shown in FIG. 2, a processor 31, a read-only memory (ROM) 32, a random-access memory (RAM) 33, a data memory 34, a communication device 35, an interface 36, 37, an obstacle detector 38, a position detector 39, a moving mechanism (a mover) 40, and the like.

The processor 31 corresponds to a central portion of a computer that performs processing such as an arithmetic operation and control necessary for an operation of the autonomously traveling device 11. The processor 31 controls each unit to implement various functions of the autonomously traveling device 11 based on a program such as system software, application software, or firmware stored in the ROM 32 or the data memory 34. Some of the various functions implemented by the processor 31 may be implemented by a hardware circuit.

The processor 31 is connected to the ROM 32, the RAM 33, the data memory 34, the communication device 35, the interface 36, 37, the obstacle detector 38, the position detector 39, and the moving mechanism 40. Examples of the processor 31 include a central processing unit (CPU), a micro processing unit (MPU), a system-on-a-chip (SoC), a digital signal processor (DSP), a graphics processing unit (GPU), an application specific integrated circuit (ASIC), a programmable logic device (PLD), or a field-programmable gate array (FPGA). The processor 31 is a combination of a plurality thereof.

The ROM 32 is a non-volatile memory that stores a program, control data, and the like. The program and the control data stored in the ROM 32 may be incorporated in advance in response to the specifications of the autonomously traveling device 11. The RAM 33 is a volatile memory. The RAM 33 temporarily stores data or the like being processed by the processor 31. The RAM 33 stores various application programs based on commands from the processor 31. The RAM 33 may store data required for executing the application programs, execution results of the application programs, and the like.

The data memory 34 is a non-volatile memory capable of writing and rewriting data. The data memory 34 includes, for example, a hard disk drive (HDD), a solid state drive (SSD), or a flash memory. The data memory 34 stores various data and a program for implementing an operation of the autonomously traveling device 11. The data memory 34 stores data used when the processor 31 performs various processing, data generated by the processing in the processor 31, various setting values, and the like.

The program stored in the ROM 32 or the data memory 34 includes a program for executing processing to be described below. For example, the autonomously traveling device 11 may transfer the program to an administrator or the like in a state where the program is stored in the ROM 32 or the data memory 34. However, the autonomously traveling device 11 may also transfer the program to an administrator or the like in a state where the program is not stored in the ROM 32 or the data memory 34. In this case, the program for executing processing to be described below may be separately transferred to the administrator and written in the data memory 34 by an operation of the administrator, a service personnel, or the like.

The transfer of the program at this time can be implemented, for example, by recording the program on a removable storage medium such as a magnetic disk, a magneto-optical disk, an optical disk, or a semiconductor memory, or by downloading the program via a network or the like.

The data memory 34 stores, for example, an autonomously traveling program 34a and a map data 34b.

The autonomously traveling program 34a is a program for moving the cart main body 10 to an autonomously traveling cart storage space from any position. The autonomously traveling program 34a has a function of determining a moving route for moving the cart main body 10 to an autonomously traveling cart storage space from any position (position at which the cart main body 10 is left). The autonomously traveling program 34a also has a function of controlling a driving mechanism for moving the cart main body 10 on the moving route. The autonomously traveling program 34a further has a function of moving the cart main body 10 while correcting the moving route if an obstacle is detected on the moving route.

The map data 34b displays map information in a range (autonomously traveling cart storage area) where the cart main body 10 can move to an autonomously traveling cart storage space while autonomously traveling. For example, the map data 34b includes information showing autonomously traveling cart storage spaces installed in the autonomously traveling cart storage area (i.e., an autonomous driving storage area). The map data 34b may include a map indicating a place to be avoided when the cart main body 10 is autonomously traveling in the autonomously traveling cart storage area or a recommended area for the cart main body 10 to be autonomously traveling. That is, the map data 34b may be data including a map of a range (within the autonomously traveling cart storage area) in which the cart main body 10 is to be autonomously traveling. The map data 34b may include information necessary for designing a moving route for the cart main body 10 to be autonomously traveling or for correcting the moving route. For example, the map data 34b is data showing map information of a parking lot as an autonomously traveling cart storage area. The communication device 35 is an interface for communicating with an external device. For example, the communication device 35 may be a network interface for connection to various servers for communication via a network. The network may be a local area network (LAN), a wide area network (WAN), or a private network such as an intranet. The communication device 35 may perform wireless communication, wired communication, and communication in which a wireless line and wired line are mixed.

The interface 36 is connected to the user interface device 12A. The user interface device 12A includes a display, a touch panel, an operation button, a speaker, a microphone, and the like. The display is, for example, a display device such as a liquid crystal display or an organic EL display. The touch panel functions as an input device that receives a touch operation of a user thereof. The operation button is an input device that receives an operation of a user. The speaker outputs an input voice signal as a sound wave. The microphone converts voice or the like uttered by a user into a signal or the like and inputs the signal.

The interface 37 is connected to the merchandise reader 12B. The processor 31 may control the merchandise reader 12B via the interface 37 or acquire information read by the merchandise reader 12B.

The obstacle detector 38 includes an obstacle sensor or the like that detects an obstacle. In the obstacle detector 38, a distance sensor that measures the distance to an object such as an obstacle or a person is used as the obstacle sensor, for example. Examples of the distance sensor used as the obstacle sensor include a laser range finder, an optical parallax distance meter, a stereo camera, radar, or an ultrasound sensor. A plurality of sensors may be combined to collectively operate as the obstacle sensor. The obstacle sensor is not limited to those described above, and any obstacle sensor may be used as long as the obstacle sensor detects an obstacle hindering movement of the cart main body 10.

The position detector 39 detects its own position, which is consequently the position of the cart main body 10. The position detector 39 includes a device or a sensor used for estimating the position of the cart main body 10. The position detector 39 measures the physical quantity (relative distance) indicating the position of the cart main body 10 or the physical quantity necessary for estimating the position of the cart main body 10. The processor 31 determines (estimates) the position of the cart main body 10 based on the information from the position detector 39.

The position detector 39 includes, for example, sensors such as a rotation angle sensor which measures the rotation angles of the wheels 23, a gyro sensor, or an acceleration sensor. A plurality of sensors may be combined to collectively operate as the position detector 39. The position detector 39 may be a device that estimates the position of the cart main body 10 using, for example, a global navigation satellite system (GNSS) such as a global positioning system (GPS), an indoor messaging system (IMES), a positioning system in which an access point such as a wireless LAN is used, a positioning system in which a beacon such as Bluetooth® low energy (BLE) is used, a positioning system in which terrestrial magnetism is used, dead reckoning (DR), or a positioning system in which a plurality thereof are combined. The moving mechanism 40 is configured to move the cart main body 10. The moving mechanism 40 is capable of rotating at least one of the wheels 23 and is capable of changing a direction of at least one of the wheels 23. For example, the moving mechanism 40 may include eight motors, each wheel 23 being associated with two motors, one of the two motors being capable of rotating the wheel 23 and the other of the two motors being capable of changing the direction of the wheel 23. In some embodiments, the moving mechanism 40 includes a first motor that rotates the wheels 23 and a second motor that changes the direction of the wheels 23. The moving mechanism 40 moves the cart main body 10 by operating (rotating and/or changing a direction of) the wheels 23 in response to an instruction from the processor 31. The processor 31 sets a moving route for moving the cart main body to an autonomously traveling cart storage space indicated in map data from the own position which the position detector 39 detects. The processor 31 operates the moving mechanism 40 so that the cart main body moves along the moving route. The processor 31 corrects the moving route if the obstacle detector 38 detects an obstacle on the moving route. In this case, the processor 31 controls the moving mechanism 40 so that the cart main body 10 moves the corrected moving route. Next, the map data 34b stored in the data memory 34 will be described.

In the present embodiment, description will be made while assuming an operation form in which the cart main body 10 autonomously travels from any place in a predetermined autonomously traveling cart storage area toward an autonomously traveling cart storage space. A parking lot or the like installed along with a store is assumed as the autonomously traveling cart storage area. The autonomously traveling cart storage area may be each floor of a store, the vicinity of an exit of the store, the vicinity of a checkout counter for merchandise, and the like. Any area may be used as the autonomously traveling cart storage area as long as the area can allow the cart main body 10 to autonomously travel, and may be, for example, the whole store.

Figure 3:
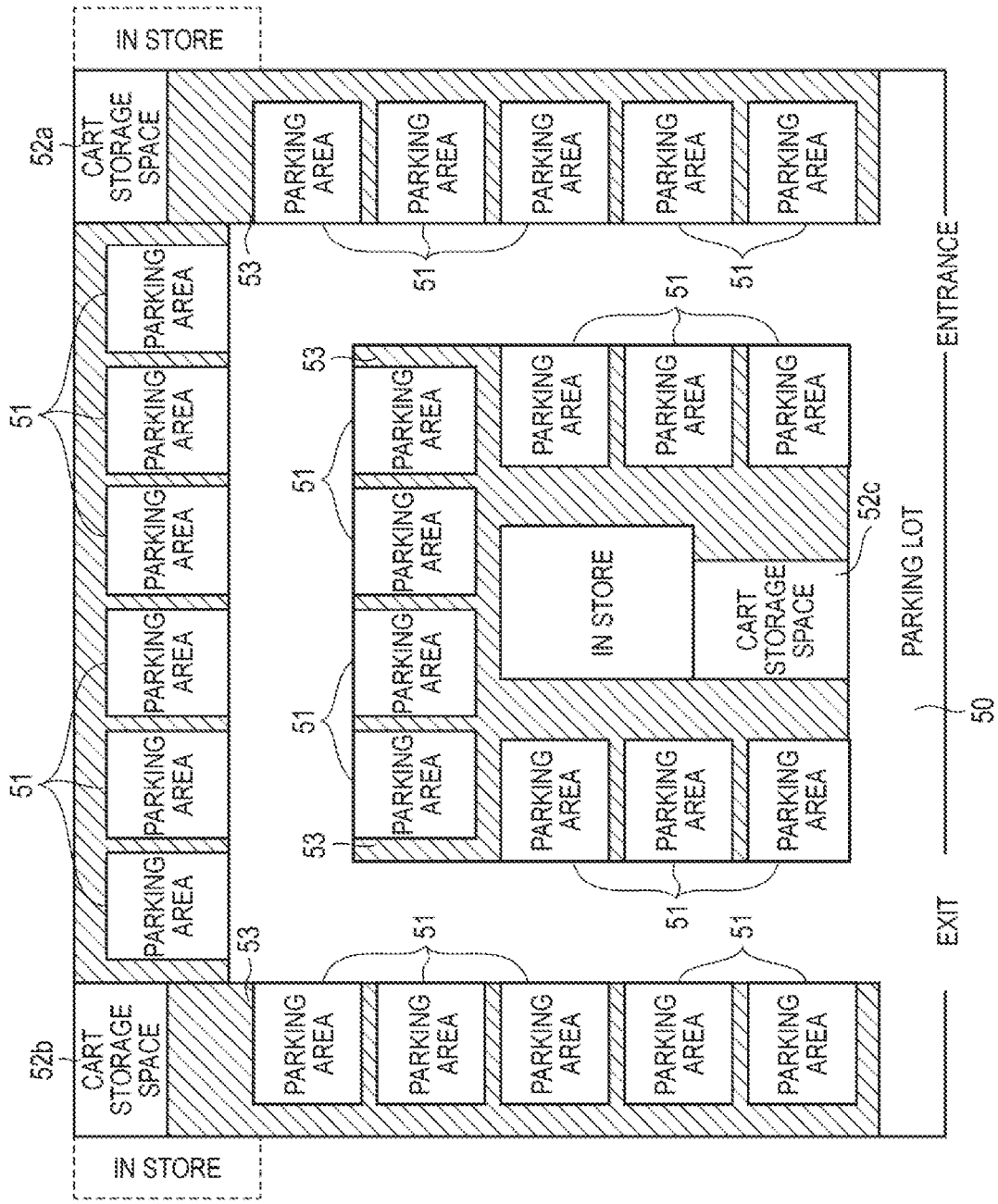
FIG. 3 is a diagram showing an example of a map of a parking lot as an autonomously traveling cart storage area in which a cart main body is autonomously traveling.

FIG. 3 is a diagram showing an example of a map of a parking lot as an example of an autonomously traveling cart storage area.

In the example shown in FIG. 3, a plurality of parking areas 51 in which vehicles are to be parked are arranged in a parking lot 50. Autonomously traveling cart storage spaces (cart storage spaces) 52 are installed in the vicinity of entrances to a store from the parking lot 50. In the example shown in FIG. 3, there are three entrances provided in the parking lot 50. The autonomously traveling cart storage spaces 52 (52a, 52b, 52c) are respectively installed at the three entrances.

Recommended areas (traveling areas) 53, shown by hatched lines in FIG. 3, for the cart main body 10 to autonomously travel are set in the parking lot 50. The traveling areas 53 are areas with high safety for the cart main body 10 to autonomously travel (it is least likely that cars or people will be in the traveling areas 53, so it is least likely that an obstacle will be encountered in the traveling areas 53).

The cart main body 10 may travel in an area other than the traveling areas 53, but the processor 31 is set to maintain the moving route in the traveling areas 53 if at all possible. For example, a moving route along which the cart main body 10 travels between a location in the parking lot 50 and an autonomously traveling cart storage space may be designed where the cart main body 10 autonomously travels through the traveling areas 53 if at all possible.

The map data 34b is map information as shown in FIG. 3 which includes information necessary for the cart main body 10 to move (to autonomously travel) toward an autonomously traveling cart storage space. Information indicating the positions of all the autonomously traveling cart storage spaces installed in the autonomously traveling cart storage area, information indicating a traveling area of the cart main body 10, and the like are included as the map data 34b. Information such as a passage of a vehicle or a person, or a place where a failure is likely to occur if the cart main body 10 travels may be stored in the map data 34b.

If a plurality of autonomously traveling cart storage areas are set, map data of each area to which unique identification information (map ID) is given may be stored in the data memory 34.

The map data 34b may be downloaded from an external device such as a server via the communication device 35. The map data may be stored in the data memory 34 via a local interface from a portable storage medium.

The map data may be generated by an administrator or an operator, and may be generated or updated while a map generation device autonomously travels in a store. For example, a method such as simultaneous localization and mapping (SLAM) can be applied as the method for generating map data while the map generation device autonomously travels.

Next, an operation of the autonomously traveling cart system 1 according to the embodiment will be described.

Figure 4:
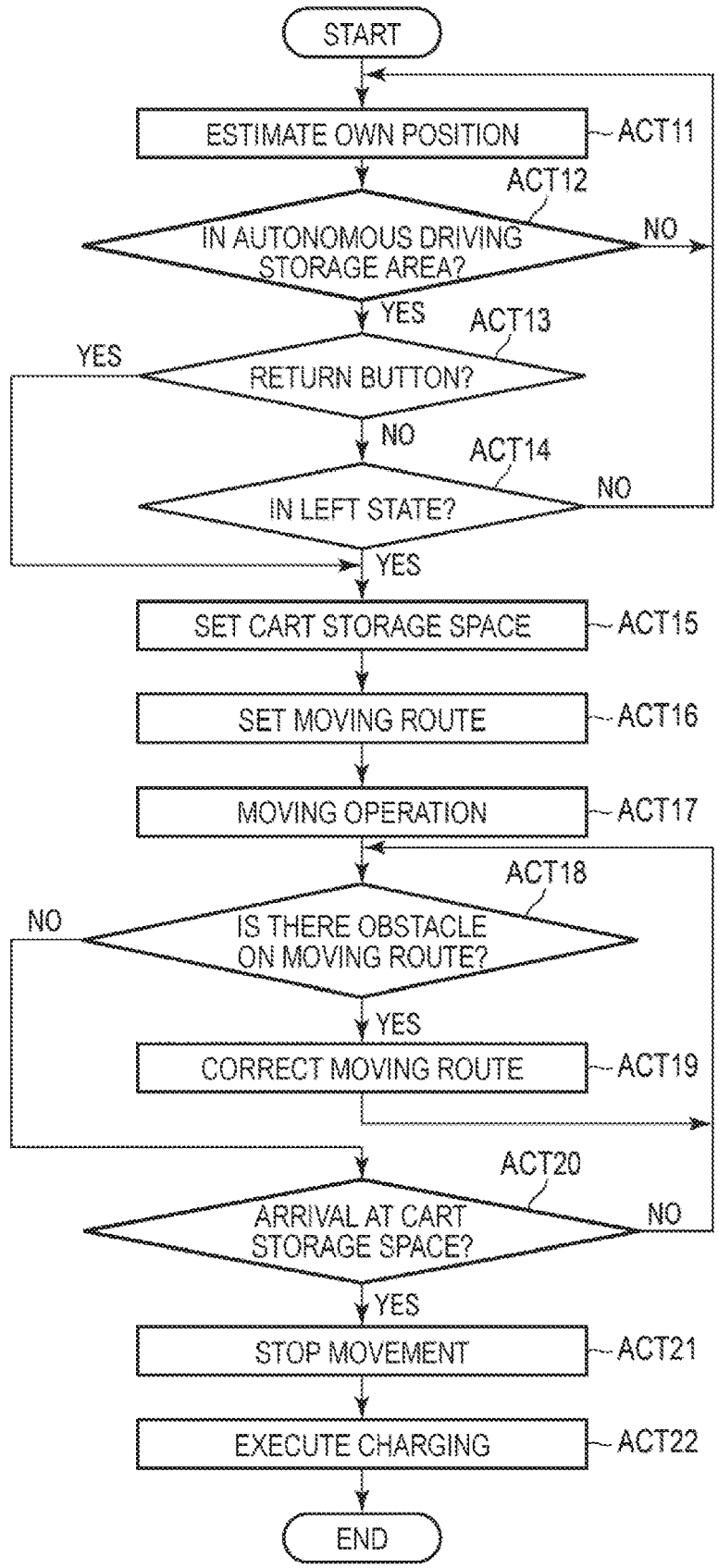
FIG. 4 is a flowchart for illustrating an operation example of the shopping cart.

FIG. 4 is a flowchart for illustrating an operation example of the autonomously traveling cart system 1 according to the embodiment.

The processor 31 of the autonomously traveling device 11 estimates the position of the cart main body 10 based on the position information which the position detector 39 detects (ACT 11). If the position of the cart main body 10 is estimated, the processor 31 determines whether or not the position of the cart main body 10 is in a predetermined autonomously traveling cart storage area where the cart main body can autonomously travel toward an autonomously traveling cart storage space (ACT 12). For example, if an operation of storing a cart left in a parking lot in an autonomously traveling cart storage space is implemented, the autonomously traveling cart storage area is set to an area in the parking lot. If the autonomously traveling cart storage area is set as a parking lot, the cart main body 10 left in an unspecified place in the parking lot can be stored in the autonomously traveling cart storage space. Accordingly, after merchandise is transferred from the cart main body 10 to a vehicle in the parking lot, a user does not need to carry the cart main body 10 toward the autonomously traveling cart storage space by a user's own operation and can just leave the cart main body 10 near the vehicle.

The autonomously traveling cart storage area is not limited to the parking lot. Any area may be set as the autonomously traveling cart storage area as long as a cart can autonomously travel toward an autonomously traveling cart storage space in the area. For example, the entire store may be set as an autonomously traveling cart storage area, or the vicinity of a checkout counter in a store or the vicinity of an entrance may be set as an autonomously traveling cart storage area.

If the processor 31 determines that the position of the cart main body 10 is within an autonomously traveling cart storage area (ACT 12, YES), the processor activates a return button for a user to instruct storage of the cart main body in the autonomously traveling cart storage space (ACT 13). For example, if the return button is realized using a button that can be selected on a touch panel of the UI device 12A, the processor 31 displays the selectable return button on the display of the UI device 12A. If the return button is a dedicated hard key, the processor 31 activates input to the return button as the hard key and receives the input to the return button.

If there is no input to the return button (ACT 13, NO), the processor 31 determines whether or not the cart main body 10 is left (ACT 14) (such as being left near where a vehicle was parked). For example, the processor 31 determines that the cart main body 10 is left where there is no change in the determined position (by the position detector 39) of the cart main body 10 for a predetermined time. In this case, the processor 31 may determine whether or not the determined position of the cart main body 10 changes based on position information which the position detector 39 detects continuously (in a predetermined cycle).

The processor 31 may determine that the cart main body 10 is left when there is no contact of a person with the handle 26 for a predetermined time. The contact of a person with the handle 26 may be detected, for example, by a contact sensor provided in the handle 26 and communicable with the processor 31. In this case, the processor 31 may determine whether or not a lack of contact with the handle 26 continues for a predetermined time, using the contact sensor.

The processor 31 may determine that the cart main body 10 is left when there is no merchandise in the storage basket 22 for a predetermined time. Whether or not there is merchandise in the storage basket 22 may be detected, for example, by the merchandise reader 12B. In this case, the processor 31 may determine when there is no merchandise in the storage basket 22 for a predetermined time, using the merchandise reader 12B.

Furthermore, the processor 31 may determine whether or not the cart main body 10 is left through various combinations of the above-described conditions.

If the processor determines that the cart main body 10 is left (ACT 14, YES) or if the return button is instructed by a user (ACT 13, YES), the processor 31 executes an autonomously traveling cart storage processing of causing the cart main body 10 to autonomously travel toward an autonomously traveling cart storage space.

In the autonomously traveling cart storage processing, the processor 31 first selects an autonomously traveling cart storage space for storing the cart main body 10 (ACT 15). If an autonomously traveling cart storage space is selected, the processor 31 designs a moving route for moving the cart main body 10 from the current position to the selected autonomously traveling cart storage space (ACT 16).

For example, the processor 31 selects a closest autonomously traveling cart storage space from a coordinate of the current position of the cart main body 10 and coordinates of autonomously traveling cart storage spaces with reference to the map data 34b. If the closest autonomously traveling cart storage space is selected, the processor 31 may design a moving route for moving the cart main body 10 from the current position to the selected autonomously traveling cart storage space.

The processor 31 may calculate moving routes to each autonomously traveling cart storage space shown in the map data 34b and select a moving route with a shortest moving distance from the calculated moving routes.

The processor 31 may select an autonomously traveling cart storage space in which the cart main body can move along a safest moving route from the current position of the cart main body 10. A route avoiding passages for vehicles, pedestrian passages, and places where pedestrians frequently pass is designed by the processor 31 if at all possible is considered as safe as the moving route of the cart main body 10, for example. For example, the safety level in a case where the cart main body 10 moves is set to the map data for each area. Accordingly, the processor 31 can select an autonomously traveling cart storage space and a moving route in which the cart main body can move from the current position of the cart main body 10 most safely based on the safety of each area.

If the processor 31 determines a moving route, the processor 31 starts control for moving the cart main body 10 (for allowing the cart main body 10 to autonomously travel) according to the moving route (ACT 17). The processor 31 controls the movement of the cart main body 10 by instructing the moving mechanism 40 in which direction (moving direction) and at which moving speed the cart main body 10 needs to travel along the moving route. For example, the processor 31 determines the moving direction of the cart main body 10 from the set moving route and the own position estimated by the position information acquired from the position detector 39. The processor 31 provides a driving instruction according to the determined moving direction of the cart main body 10 to the moving mechanism 40. The moving mechanism 40 drives a motor or the like in response to the instruction from the processor 31 to rotate the wheels 23 while adjusting the direction of the wheels 23. If the cart main body 10 is moved, the obstacle detector 38 detects an obstacle in the moving direction. For example, the obstacle detector 38 measures the distance to an obstacle in front in the moving direction and around the cart main body 10 using a distance sensor. The processor 31 determines whether there is an obstacle on the moving route based on the distance to the obstacle which is acquired from the obstacle detector 38.

If the processor 31 determines that there is an obstacle on the moving route (ACT 18, YES), the processor 31 corrects the moving route of the cart main body 10 so as to avoid the detected obstacle (ACT 19). For example, the processor 31 corrects the current moving route so as to avoid the obstacle. The processor 31 may gradually shift the moving direction of the cart main body 10 in response to the distance to the obstacle. In this case, the processor 31 may perform control so as to return the cart main body 10 to the original moving route if there is no obstacle detected by the obstacle detector 38. The processor 31 may redesign the moving route for avoiding the detected obstacle with reference to the map data 34b.

If there is no obstacle detected (ACT 18, NO), the processor 31 monitors whether the cart main body 10 reaches an autonomously traveling cart storage space (ACT 20). For example, the processor 31 determines whether or not the cart main body 10 reaches an autonomously traveling cart storage space depending on whether or not the own position is the autonomously traveling cart storage space based on the position information acquired from the position detector 39. If the cart main body 10 does not reach an autonomously traveling cart storage space (ACT 20, NO), the processor 31 repeats the processing of ACT 18 and 19 so that the cart main body 10 continues the movement (autonomously traveling).

If the cart main body 10 reaches an autonomously traveling cart storage space (ACT 20, YES), the processor 31 stops the driving of a motor or the like of the moving mechanism 40 and stops the movement (autonomously traveling) of the cart main body 10 (ACT 21). Here, the autonomously traveling cart main body 10 is stored at a chargeable position by stopping at the autonomously traveling cart storage space. Accordingly, the power receiver 14 provided in the cart main body 10 receives power from the power transmitter provided in the autonomously traveling cart storage space, and charges the battery 13 with the received power (ACT 22).

According to the above-described embodiment, if a cart main body 10 is left or a return button for instructing storage of a cart main body 10 in an autonomously traveling cart storage space is pressed, the autonomously traveling device of the autonomously traveling cart system 1 detects the current position of the cart main body 10 and designs a moving route from the current position toward the autonomously traveling cart storage space with reference to map data. The autonomously traveling device allows the cart main body 10 to move so as to travel along the moving route, thereby the cart main body 10 moving toward the autonomously traveling cart storage space by the moving mechanism 40.

Accordingly, the autonomously traveling device according to the embodiment can allow a cart main body 10 left in any place or a cart main body 10 for which a return button is instructed to autonomous travel toward the autonomously traveling cart storage space. As a result, a user oneself does not need to carry the cart main body 10 to the autonomously traveling cart storage space in a parking lot or the like, thereby improving convenience.

Furthermore, the autonomously traveling device 11 according to the embodiment corrects the moving route so as to avoid an obstacle if the obstacle is detected by the obstacle detector during autonomously traveling, and allows the cart main body 10 to move toward an autonomously traveling cart storage space according to the corrected moving route. Accordingly, the autonomously traveling device 11 according to the embodiment can allow the cart main body 10 to autonomously travel safely toward the autonomously traveling cart storage space.

While certain embodiments have been described, the embodiments have been presented by way of example only, and are not intended to limit the scope of present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An autonomously traveling cart system comprising:
    a mover configured to move a cart main body;
    a memory configured to store map data indicating:
        an autonomously traveling cart storage space installed in an area where the cart main body is movable, and
        a place to be avoided;
    a position detector configured to detect a position of the cart main body within the area; and
    a processor configured to:
        determine a moving route from the position toward the autonomously traveling cart storage space,
        cause the mover to move the cart main body toward the autonomously traveling cart storage space based on the moving route,
        record the position over time,
        determine a variation of the position over an interval,
        compare the variation to a threshold, and
        cause the mover to move the cart main body along the moving route after determining that the variation is less than the threshold.

2. The autonomously traveling cart system according to claim 1, further comprising a battery mounted on the cart main body;
    wherein the processor is further configured to cause the cart main body to move toward a charging facility associated with the battery.

3. The autonomously traveling cart system according to claim 1, wherein the area where the cart main body is movable is a parking lot.

4. The autonomously traveling cart system according to claim 1, wherein the processor is further configured to detect that the cart main body is left and, in response to determining that the cart main body is left, cause the cart main body to move.

5. The autonomously traveling cart system according to claim 1, further comprising a return button communicable with the processor;
    wherein the processor is configured to cause the cart main body to move to the autonomously traveling cart storage space in response to the return button being pressed.

6. A cart comprising:
    a cart main body;
    a wheel coupled to the cart main body, the wheel rotatable along a surface and moveable with respect to the surface;
    a motor coupled to the wheel, the motor configured to cause the wheel to rotate along the surface and to cause the wheel to move with respect to the surface;
    a position detector coupled to the cart main body and configured to determine a position of the cart main body;
    a memory configured to store map data indicating a place to be avoided; and
    a processor communicable with the motor and the position detector, the processor configured to:
        cause the motor to move the cart along a first moving route between the position and a first autonomously traveling cart storage space,
        record the position over time,
        determine a variation of the position over an interval,
        compare the variation to a threshold, and
        cause the motor to move the cart along the first moving route after determining that the variation is less than the threshold.

7. The cart of claim 6, further comprising an obstacle detector coupled to the cart main body, the obstacle detector configured to detect obstacles proximate the cart main body;
   wherein the processor is communicable with the obstacle detector; and
   wherein the processor is further configured to adjust the first moving route in response to the obstacle detector detecting an obstacle.

8. The cart of claim 6, further comprising a battery coupled to the cart main body, the battery communicable with the motor, the position detector, and the processor, the battery configured to receive power wirelessly when the position is at the first autonomously traveling cart storage space.

9. The cart of claim 6, further comprising a communication device coupled to the cart main body, the communication device communicable with the processor, the communication device configured to receive the map data from an external network, the map data comprising a first storage space location;
   wherein the processor is configured to determine the first autonomously traveling cart storage space based on the first storage space location.

10. A system comprising:
   a charging facility located at a first autonomously traveling cart storage space; and
   a cart comprising:
      a cart main body,
      a wheel coupled to the cart main body, the wheel rotatable along a surface and moveable with respect to the surface,
      a motor coupled to the wheel, the motor configured to cause the wheel to rotate along the surface and to cause the wheel to move with respect to the surface,
      a position detector coupled to the cart main body and configured to determine a position of the cart main body,
      a memory configured to store map data indicating a place to be avoided,
      an obstacle detector coupled to the cart main body, the obstacle detector configured to detect at least one obstacle proximate the cart main body, and
      a processor communicable with the motor, the position detector, and the obstacle detector, the processor configured to:
         compare the position to a first storage space location associated with the first autonomously traveling cart storage space,
         cause the motor to move the cart along a first moving route,
         adjust the first moving route in response to the obstacle detector detecting the at least one obstacle,
         record the position over time,
         determine a variation of the position over an interval,
         compare the variation to a threshold, and
         cause the motor to move the cart along the first moving route after determining that the variation is less than the threshold.

11. The system of claim 10, wherein the cart further comprises a battery coupled to the cart main body, the battery communicable with the motor, the position detector, and the processor, the battery configured to receive power wirelessly from the charging facility when the cart is located at the first autonomously traveling cart storage space.

12. The system of claim 10, wherein the cart further comprises a communication device coupled to the cart main body, the communication device communicable with the processor, the communication device configured to receive the map data from an external network, the map data comprising the first storage space location.

* * * * *